United States Patent
Sollom et al.

(10) Patent No.: US 7,096,322 B1
(45) Date of Patent: Aug. 22, 2006

(54) INSTRUCTION PROCESSOR WRITE BUFFER EMULATION USING EMBEDDED EMULATION CONTROL INSTRUCTIONS

(75) Inventors: Jason D. Sollom, Champlin, MN (US); James A. Williams, Mahtomedi, MN (US)

(73) Assignee: Unisys Corporation, Blue Bell, PA (US)

( * ) Notice: Subject to any disclaimer, the term of this patent is extended or adjusted under 35 U.S.C. 154(b) by 530 days.

(21) Appl. No.: 10/683,028

(22) Filed: Oct. 10, 2003

(51) Int. Cl.
*G06F 12/02* (2006.01)

(52) U.S. Cl. .................................................. 711/143
(58) Field of Classification Search ........... 711/137, 711/143, 154
See application file for complete search history.

(56) References Cited

U.S. PATENT DOCUMENTS

| | | | |
|---|---|---|---|
| 4,868,822 A * | 9/1989 | Scott et al. | 714/29 |
| 6,973,417 B1 * | 12/2005 | Maxwell et al. | 703/2 |
| 2002/0170030 A1 * | 11/2002 | Halcomb et al. | 716/16 |
| 2003/0009612 A1 * | 1/2003 | Latta | 710/240 |
| 2005/0068800 A1 * | 3/2005 | Fahmy et al. | 365/63 |
| 2005/0289485 A1 * | 12/2005 | Willis | 716/1 |

* cited by examiner

*Primary Examiner*—Kevin L. Ellis
(74) *Attorney, Agent, or Firm*—Charles A. Johnson; Mark T. Starr; Shumaker & Sieffert

(57) ABSTRACT

Techniques are described for accurately and efficiently emulating an instruction processor having a write buffer. The described techniques may be utilized to quickly develop an emulated instruction processor that provides a fully-functional write buffer interface in an efficient and elegant manner. For example, a system is described that includes a computing system that provides an emulation environment, and software executing within the emulation environment that emulates an instruction processor having a write buffer interface and a memory interface. The software emulates the instruction processor by selectively outputting a write request on the write buffer interface or the memory interface in response to an emulation control instruction embedded within an instruction stream.

27 Claims, 4 Drawing Sheets

INSTRUCTION PROCESSOR WRITE BUFFER EMULATION USING EMBEDDED EMULATION CONTROL INSTRUCTIONS

TECHNICAL FIELD

The invention relates to computer systems and, more particularly, emulation techniques to aid in the design and testing of computer systems

BACKGROUND

A computer system typically involves multiple components working in cooperation to perform a task. For example, a computer system may include one or more co-operating instruction processors. These instruction processors may be supported by communication busses, cache memories, shared and dedicated memories, input/output (I/O) devices, interface hardware, and the like.

The process of designing and ensuring proper functionality of these constituent components, i.e., development process, is involved and time consuming. In addition, the demand for computer systems of increasing complexity, such as computer systems that can provide more throughput, further increase the time and resources required to design and ensure the proper functionality of components.

In order to expedite the design process, emulation tools are often used to assist in testing the functionality of a component or system being designed. During this process, one or more emulation modules are often developed to interface with and test the functionality of the components being designed. For example, a designer currently developing a memory architecture may use an emulation module to mimic the functionality of an associated instruction processor. The emulated instruction processor may be used, for example, to interact with the memory architecture being developed in a manner that conforms to that of an actual instruction processor in order to test the operation of the memory architecture. As the processor itself may also not yet be implemented, the use of an emulated instruction processor allows the development of the actual instruction processor and the memory architecture to proceed concurrently. In this manner, the development period needed to complete the overall computer system may be compressed.

A designer may develop an emulation module for a particular component by utilizing an editor or other software application to describe the functionality of the component in accordance with a hardware description language (HDL). Examples of widely-used HDLs include the Very high-speed integrated circuits Hardware Description Language (VHDL) and Verilog™, which is described in the IEEE Verilog 1364-2000 standard. These languages support syntaxes that appear similar to software programming languages, such as C++ and Java, and allow the designer to define and simulate components using high-level code by describing the structure and behavior of components.

While the use of emulation can greatly aid in the development of the computer system, even the design of operationally-correct emulation modules requires time and resources. In other words, development of an emulated instruction processor that correctly mimics the functionality of an actual instruction processor is a complex and time-consuming process. For example, one feature of an instruction processor that may require significant resources to accurately emulate is the incorporation of a write buffer.

A write buffer is a type of first in, first out (FIFO) queue that typically resides within the instruction processor and provides storage space for pending write requests. The instruction processor typically issues the write requests queued in the write buffer as "pre-fetch" write requests to a cache via a dedicated write buffer interface, and subsequently issues the corresponding "real" write request to the cache via a memory interface. The pre-fetch write requests are typically used to reserve ownership of cache lines within the cache prior to the issuance of the actual write requests. In this manner, the execution of the subsequent write request may be accelerated as the instruction processor has already reserved ownership of the cache lines. Time-saving techniques directed to the efficient and accurate development and configuration of an emulated instruction processor having write buffers may further reduce the overall time necessary to develop a computer system.

SUMMARY

In general, techniques are described for emulating an instruction processor for use during the development of a computer system. Specifically, the techniques describe an emulated instruction processor that accurately and efficiently emulates an instruction processor having a write buffer. The described techniques may be utilized to quickly develop an emulated instruction processor that provides a fully-functional write buffer interface in an efficient and elegant manner. By making use of the techniques described herein, design resources do not need to be allocated to developing and incorporating logic within the emulated instruction processor to fully implement the write buffer in order to achieve a functionally accurate write buffer interface.

The emulation techniques make use of specially-defined emulator control instructions that are inserted into an instruction stream provided to the emulated instruction processor. When executed, the emulation control instructions set control bits within an associated emulator control register of the emulated instruction processor. Based on the control bits, the emulated instruction processor selectively sends write requests to the cache via the write buffer interface or via a standard memory interface. A compiler may be used to compile test software for execution by the emulated instruction processor, and may automatically insert the emulation control instructions throughout the instruction stream as necessary to selectively direct write instructions to the write buffer interface and the memory interface. In this manner, the emulated instruction processor need not incorporate design logic to fully implement the write buffer, thereby reducing the complexity of the emulated instruction processor and design resources that otherwise would be spent developing the write buffer itself.

In addition, emulation techniques are described that allow an emulated instruction processor to accurately and efficiently incorporate cache control lines for controlling the operation of the cache. In particular, the techniques provide for the emulation of cache control lines when write commands are issued via the write buffer interface or the memory interface. In a manner similar to that describe above, emulation control instructions are inserted into the instruction stream to control the write attributes associated with the write commands and, in particular, control whether the cache control lines direct the cache to operate as a "leaky" cache or as a write-back cache when processing the associated write command. As used herein, the term "leaky" cache refers to an attribute associated with a write command whereby the data written by the write command is flushed, i.e. "leaked," from the cache to main memory sooner than the other data in the cache. In particular, the data is flushed to main memory after a delay period, and prior to the other data stored within the cache. In this manner, the emulation control instructions may be used to drive the cache control lines of the emulated instruction processor to emulate operation of an actual instruction processor. The emulation control instructions may set additional control bits associated with the emulator control register found within the emulated instruction processor.

In one embodiment, a processor-based method comprises processing an emulation control instruction with an emulated instruction processor to set a state of a pre-fetch control bit within the emulated instruction processor, wherein the emulated instruction processor has a write buffer interface and a memory interface. The method further comprises processing a write instruction with the emulated processor to selectively output a write request via the write buffer interface or the memory interface based on the state of the pre-fetch control bit.

In another embodiment, a processor-based method comprises compiling test software to output an instruction stream for execution by for an emulated instruction processor, and processing the instruction stream during compilation to insert one or more instructions into the instruction stream to direct the emulated instruction processor to output pre-fetch write requests out a write buffer interface upon execution of the instruction stream.

In another embodiment, a computer-implemented system for emulating write buffer operation comprising a computing system to provide an emulation environment, and software executing within the emulation environment to emulate an instruction processor having a write buffer interface and a memory interface. The software emulates the instruction processor by selectively outputting a write request on the write buffer interface or the memory interface in response to an emulation control instruction embedded within an instruction stream.

In another embodiment, a computer-implemented system for emulating write buffer operation comprises computing means for providing an emulation environment, compiling means for compiling a test script to produce an instruction stream having at least one write instruction and processor emulating means for emulating an instruction processor having a write buffer interface and a memory interface. The processor emulating means includes selection means for outputting a write request on the write buffer interface or the memory interface in response to an emulation control instruction embedded within an instruction stream.

The invention may provide one or more advantages. In general, the techniques may be utilized to develop an emulated instruction processor more quickly and/or with fewer design resources. Moreover, the use of emulation control instructions may extend the flexibility of the emulated system allowing a designer to more quickly configure and test an emulated system. For example, the techniques describe an efficient and elegant solution to emulating operation of an instruction processor having a write buffer and a write buffer interface without requiring the development of the complex logic associated with the write buffer. In similar manner, the techniques describe an efficient and elegant solution for emulating an instruction processor having write attribute control lines that may be asserted or de-asserted for individual write commands.

The described techniques may be utilized to quickly develop an emulated instruction processor that provides a fully-functional write buffer interface in an efficient and elegant manner. By making use of the techniques described herein, design resources do not need to be allocated to developing and incorporating logic within the emulated instruction processor to fully implement the write buffer in order to achieve a functionally accurate write buffer interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
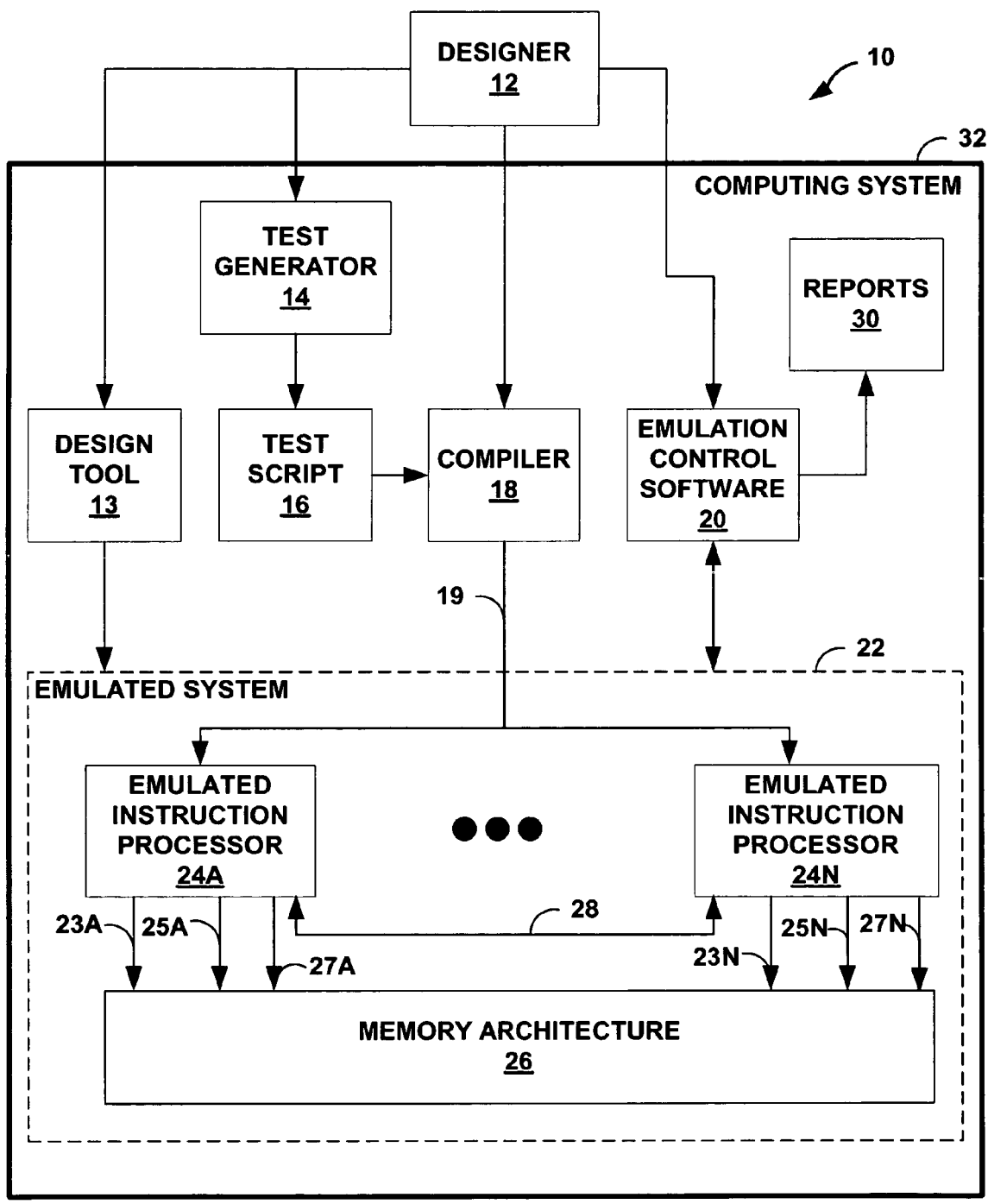
FIG. 1 is a block diagram illustrating an example emulation environment.

FIG. 1 is a block diagram illustrating an example emulation environment 10 in which a designer 12 makes use of computer-aided techniques to aid in the design, simulation and verification of components associated with a computer system. In particular, designer 12 interacts with design tool 13 to develop the constituent components of emulated system 22. In the exemplary embodiment of FIG. 1, emulated system 22 includes one or more emulated processors 24A–24N ("emulated processors 24") that emulate the functionality of instruction processors to aid in the design and testing of inter-processor message bus 28 and memory architecture 26, which may comprise a hierarchy of caches and memory units. For exemplary purposes the techniques are described in reference to emulation of a multiprocessor system, however the techniques are not so limited and the claims should not be limited in scope to this context. Emulated system 22 may comprise additional components, such as peripheral devices, input/output interfaces, and the like. However, for ease of illustration, these other components are not shown in FIG. 1.

Design tool 13 may comprise a circuit design tool with which designer 12 interacts to develop graphical representations of the components of emulated system 22 in the form of one or more schematic diagrams. Designer 12 invokes design tool 13 to graphically layout the component instances of emulated system 22 and define signals to interconnect the instances. Alternatively, design tool 13 may comprise an editor or other software application with which designer 12 interacts to describe emulated system 22 in accordance with a hardware description language (HDL). An example of a circuit design tool is Concept® HDL from Cadence Design Systems, Inc. of San Jose, Calif. Examples of widely used HDLs include the Very high speed integrated circuits Hardware Description Language (VHDL) and Verilog™.

Designer 12 utilizes test script 16 to test the functionality of the components within emulated system 22, such as memory architecture 26 and message bus 28. In particular, designer 12 configures test generator 14 to generate test script 16, which defines software programs for execution by emulated instruction processors 24. Compiler 18 compiles test script 16 to generate one or more instruction streams 19 in the form of machine executable instructions. During this process, as further described herein, compiler 18 may automatically insert emulation control instructions to aid the emulation of fully-functional instruction processors. For example, compiler 18 inserts emulation control instructions throughout instruction streams 19 as necessary to extend the functionality of emulated instruction processors 24 to more accurately and efficiently emulate instruction processors having internal write buffers and write buffer interfaces. In a similar manner, compiler 18 inserts emulation control instructions into instruction streams 19 to control the write attributes and, in particular, control the states of cache control lines 27A through 27N, collectively cache control lines 27, to direct respective caches within memory architecture 26 to operate as a "leaky" cache or as a write-back cache when processing the associated write command. As used herein, the term "leaky" cache refers to an attribute associated with the write command whereby the data written by the write command is flushed, i.e. "leaked," from the cache to main memory sooner than the other data in the cache. In particular, the data is flushed to the main memory after a delay period, and prior to the other data stored within the cache. Upon completion of compilation, compiler 18 outputs instruction streams 19 to emulated instruction processors 24. In one embodiment, each of instruction streams 19 is loaded into one or more internal memories (not shown) within a respective one of emulated instruction processors 24.

Once loaded, emulated instruction processors 24 execute the instructions contained within instruction streams 19 and mimic the operation of fully-designed instruction processors to test the constituent components of a computer system. In particular, emulated instruction processors 24 mimic instruction processors that incorporate internal write buffers and present write buffer interfaces to memory architecture 26. Emulated instruction processors 24 execute emulation control instructions inserted within instructions streams 19 and selectively send write requests to memory architecture 26 via respective memory interfaces 23A through 23N, collectively memory interfaces 23, and write buffer interfaces 25A through 25N, collectively write buffer interfaces 25. In this manner, issuance of pre-fetch write requests via write buffer interfaces 25 may be emulated without requiring implementation of full write buffers.

Specifically, as described in further detail below, emulated instruction processors include emulator control registers, as further illustrated below, and the emulation control instructions cause emulated instruction processors 24 to toggle control bits within the emulator control registers to control whether write requests are issued as pre-fetch writes via write buffer interfaces 25 or as conventional write requests via memory interfaces 23. Other control bits included within the emulator control register may cause memory architecture 26 to change functionality providing further aid to designer 12 in developing a computer system. By introducing emulation control instructions into instruction streams 19 such that the control bits are toggled appropriately, emulated instruction processors 24 may mimic processors having a write buffer without implementing the logic associated with the write buffer.

Once execution is complete, designer 12 may invoke emulation control software 20 to analyze the state of emulated system 22 and generate reports 30. Emulation control software 20 may analyze the contents of memory architecture 26 and emulated instruction processors 24, such as internal registers within emulated instruction processors 24, for errors. Emulation control software 20 may compare these contents against expected results computed by compiler 18, and flag the errors in reports 30. In addition, emulated instruction processors 24 may have built in error detection. In particular, emulated instruction processors 24 may be loaded with comparison data, and may incorporate functionality to use the comparison data during reads from memory architecture 26 to verify previously executed reads and writes were executed correctly. Reports 30 may indicate results of the error detection, actual results, expected results, and the like.

Reports 30 may, for example, identify errors or unexpected results from the execution of test script 16 in an attempt to aid designer 12 in locating and resolving design errors within emulated system 22 and, in particular, the non-emulated components, e.g., memory architecture 26. Thus, emulated instruction processors 24 may aid in developing and ensuring proper functionality through executing instructions to test the functionality of non-emulated components.

Computing system 32 provides a platform for execution of emulation programs and utilities, such as, design tool 13, test generator 14, compiler 18 and emulation control software 20. Computing system 32 may comprise one or more computers, each having a processor, working in cooperation to form emulation environment 10. In particular, each computer included within computing system 32 may execute one or more of the above programs. For example, one computer may execute test generator 14 to generate test script 16. Another computer may execute compiler 18 to compile test script 16. Yet another computer may execute design tool 13, emulated system 22 and emulation control software 20, wherein emulated system 22 executes instruction streams 19 and emulation control software 20 analyzes results of executing instruction streams 19 to generate reports 30. The computers may communicate information, such as test script 16 and instruction streams 19, via a local area network or any other means of communication.

Figure 2:
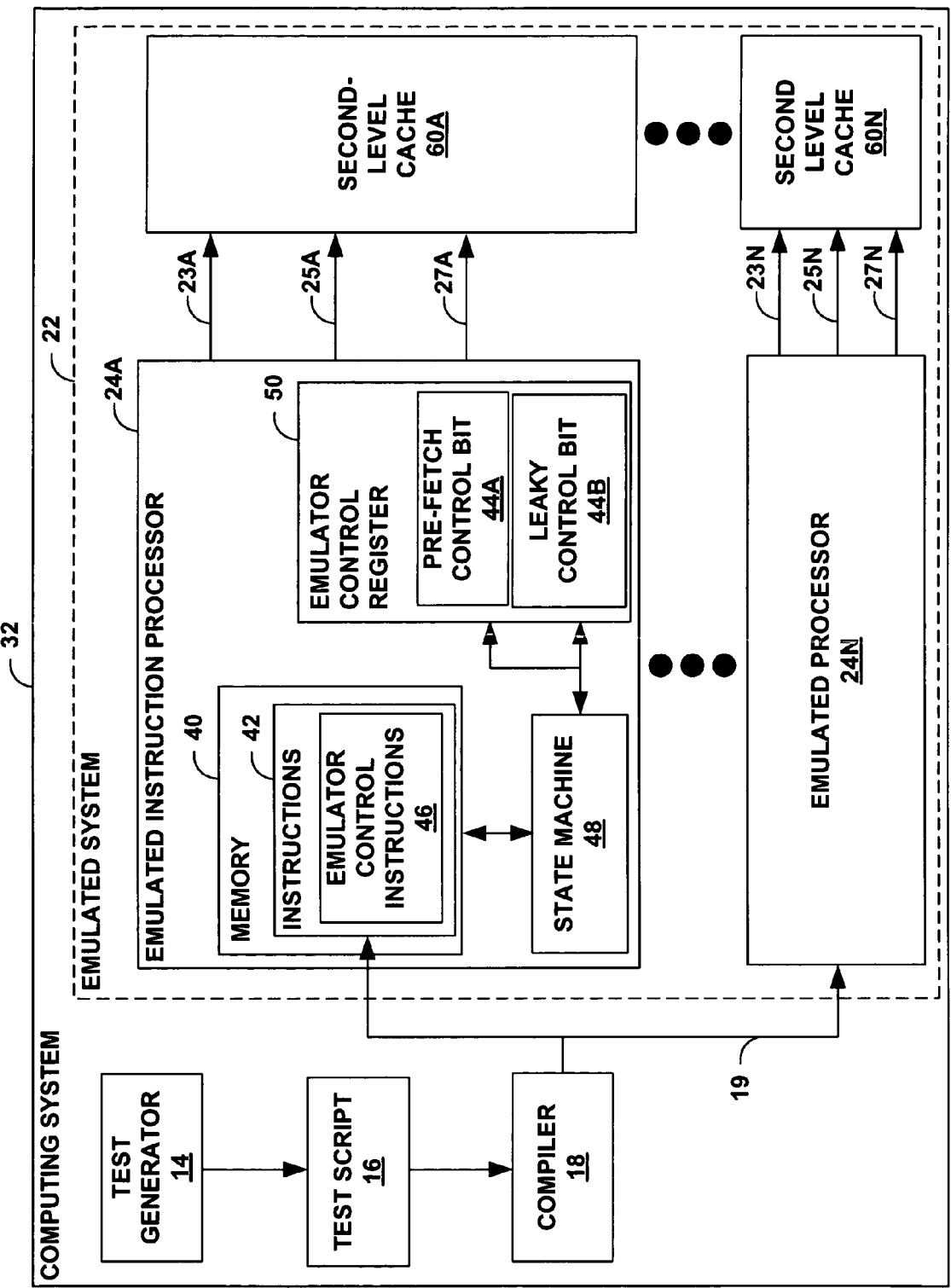
FIG. 2 is a block diagram illustrating an exemplary embodiment of a computing system that provides an operating environment for the emulation environment of FIG. 1.

FIG. 2 is a block diagram illustrating an exemplary embodiment of computing system 32 of FIG. 1 in more detail. In the illustrated embodiment of FIG. 2, emulated instruction processors 24 each connect to second-level caches 60A–60N ("second-level caches 60"). As described above, emulated system 22 emulates a computer system, and in particular a multiprocessor computer system, wherein at least one of emulated instruction processors 24 maintains emulation of a write buffer in accordance with the described techniques. For ease of illustration, emulated instruction processor 24A is depicted in further detail although any of emulated instruction processors 24 may present emulated write buffer interfaces 25 to a respective second-level cache 60.

Emulated instruction processor 24A, as shown in FIG. 2, includes internal memory 40, state machine 48, and emulator control register 50. Memory 40 provides a storage medium for instruction streams 19 in the form of executable instructions 42, which includes emulation control instructions 46 inserted by compiler 18 in the manner described above. State machine 48 accesses memory 40 to retrieve and execute instructions 42.

Emulator control register 50 provides a storage medium for control bits 44, i.e., pre-fetch control bit 44A and write-though control bit 44B, that control the operation of state machine 48 during the course of executing instructions 42. In particular, upon encountering an emulator control instruction 46 within instructions 42, state machine 48 updates the state of one or more of control bits 44 of emulator control register 50. During execution of other operations, state machine 48 may control the execution based on the states of control bits 44. In like manner, emulated instruction processors 24B–24N may also include memories, state machines, and emulator control registers similar to those shown within emulated instruction processor 24A.

During operation, emulated processors 24 communicate with second-level caches 60 via respective memory interfaces 23, write buffer interfaces 25, and cache control lines 27 in a manner that accurately emulates interfaces of a fully-implemented instruction processor. In particular, memory interfaces 23 may comprise a cache interface for communicating write requests from emulated instruction processors 24 to second-level caches 60. Write buffer interfaces 25 communicate pre-fetch write requests from emulated instruction processors 24 to second-level caches 60 to reserve ownership of cache lines prior to corresponding write requests issued via memory interfaces 23. Cache control signals 27 control operation of second-level caches 60 and, in particular direct second-level caches 60 to operate as leaky caches or a write-back caches when receiving write commands via memory interfaces 23 or write buffer interfaces 25.

As described above, test generator 14 generates test script 16 and compiler 18 processes test script 16 to generate instruction streams 19. Compiler 18 may insert instructions, such as emulation control instructions, into the instructions of test script 16 to allow emulated instruction processors 24 to mimic a processor having a write buffer without requiring complete implementation of internal write buffers. For example, compiler 18 may generate the following simplistic instruction stream from a high-level test script 16:
 READ r1, address x
 WRITE address y, r1

In the above instruction stream, a first READ instruction reads data from address x, and stores the value into register r1. Compiler 18 may automatically insert emulation control instructions to as follows:
 READ r1, address x
 EMU_CTRL_PREFETCH
 WRITE address y, r1
 EMU_CTRL_PREFETCH
 WRITE address y, r1

In this example, compiler 18 generates machine-executable instructions and inserts instructions to cause one or more of instructions processors 24 to issue a pre-fetch for the write instruction of the first instruction stream. In particular, prior to the write instruction compiler 18 automatically inserts into the instruction stream (1) a first emulator control pre-fetch instruction (EMU_CTRL_PREFETCH), (2) a duplicate of the write instructions, and (3) a second emulator control pre-fetch instruction.

The first emulator control pre-fetch instruction activates write pre-fetching by causing state machine 48 to toggle pre-fetch control bit 44A. As a result, state machine 48 processes the duplicate write instruction as a pre-fetch write request and issues the write to second-level cache 60A via write buffer interface 25A. The second EMU_CTRL_PREFETCH directs state machine 48 to again toggle pre-fetch control bit 44A, thereby disabling pre-fetch writes. As a result, state machine 48 processes the final write of the instruction stream as a conventional write request and issues the write request via memory interface 23A. In this manner, compiler 18 automatically inserts emulation control instructions and duplicate write instructions to cause emulated instruction processors 24, upon execution of instruction streams 19, to mimic instruction processors having fully-functional, internal write buffers.

As another example, consider the following instruction stream having a group of multiple write instructions:
 WRITE address y, r1
 WRITE address y+1, r2
 WRITE address y+2, r3
 WRITE address y+3, r4

Compiler 18 may automatically modify the instruction stream as follows:
 SET R5=2

LABEL EMU_CTRL_PREFETCH
 WRITE address y, r1
 WRITE address y+1, r2
 WRITE address y+2, r3
 WRITE address y+3, r4
 DEC r5
 JMP LABEL if R5>0

In this example, compiler 18 has made use of a label LABEL and a branching instruction JMP to loop through the set of write instructions twice. During the first pass of the loop, the EMU_CTRL_PREFETCH command toggles the state of pre-fetch control bit 44A, thereby setting the control bit. As a result, emulated instruction processor 24A issues each of the writes via write buffer interface 25A, i.e., as pre-fetch write requests. During the second pass of the loop, the EMU_CTRL_PREFETCH command again toggles the state of pre-fetch control bit 44A, thereby resetting the control bit. As a result, emulated instruction processor 24A issues each of the writes via memory interface 23A as conventional write requests. In this manner, compiler 18 may automatically insert a label, a branching instruction, and a single emulation control instruction to cause emulated instruction processor 24, upon execution of instruction streams 19, to mimic instruction processors having fully-functional, internal write buffers. This technique allows emulated instruction processors 24A to issue many pre-fetch requests in advance of the real write requests. In addition, fewer EMU_CTRL_PREFETCH commands may need to be inserted into instruction streams 19.

More particularly, while reading and processing instructions 42, a write instruction causes state machine 48 to access emulator control register 50 and determine whether to issue the write request associated with the write instruction via write buffer interface 25A or memory interface 23A. For example, if the value of pre-fetch control bit 44A is asserted, then state machine 48 issues the write request via write buffer interface 25A. However, if pre-fetch control bit 44A is de-asserted then state machine 48 issues the write request via memory interface 23A.

In addition, state machine 48 accesses leaky control bit 44B to determine whether to output cache control line 27A to direct cache 60A to operate as a leaky cache or as a write-back cache when processing the associated write command. If leaky control bit 44B is asserted, for example, state machine 48 outputs cache control line 27A to direct cache 60A to leak the data to main memory prior to the other data within the cache. However, if leaky control bit 44B is de-asserted, state machine 48 outputs cache control line 27A to direct cache 60A to operate as a write-back cache.

Accordingly, emulated instruction processor 24A emulates a processor having a write buffer by incorporating emulator control register 50 and executing a modified instruction stream. In this manner, emulated instruction processor accurately and efficiently emulates instructions processors having fully-implemented write buffers, and yet avoids implementing the complex logic associated with an internal write buffer. Emulated instruction processors 24 working in cooperation with compiler 18 emulate internal write buffers by incorporating relatively simple logic that supports additional instructions, e.g., emulation control instructions 46. Utilizing these techniques, development of emulated environment 22 and, in particular, emulated instruction processors 24 may be achieved with reduced development time and/or resources.

Figure 3:
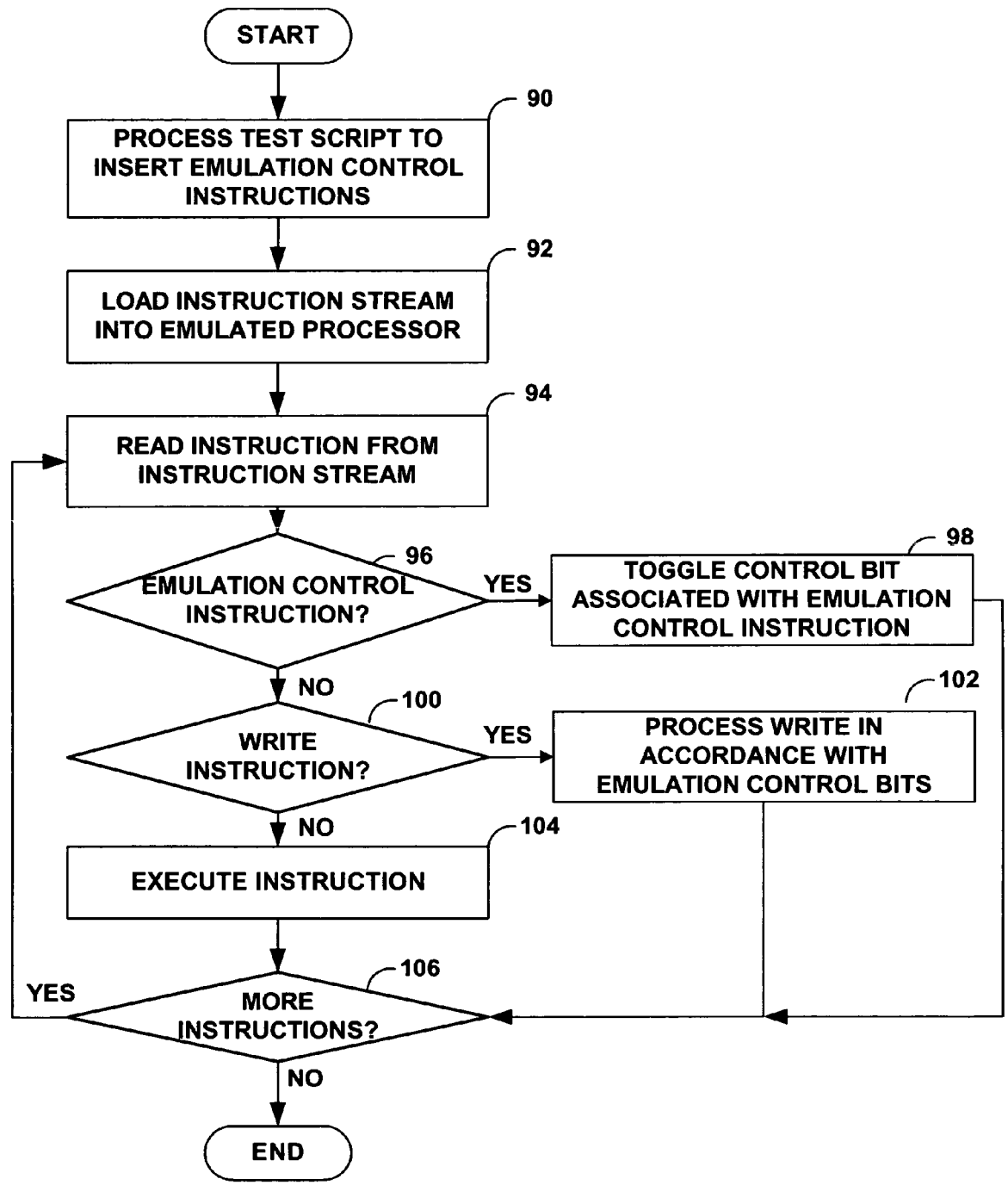
FIG. 3 is a flowchart illustrating exemplary operation of an emulated instruction processor that utilizes a write buffer to issue pre-fetch write requests.

FIG. 3 is a flowchart further illustrating the techniques for emulating an instruction processor that utilizes a write buffer to issue pre-fetch write requests. In general, the flowchart illustrates operation of computing system 32 (FIG. 2), wherein compiler 18 automatically injects emulation control instructions and duplicate writes into instruction streams 19 to direct emulated instruction processors 24 to selectively forward write requests to second-level caches 60 via memory interfaces 23 or write buffer interfaces 25. Furthermore, compiler 18 automatically inserts emulation control instructions to set attributes associated with the write requests that control whether second-level caches 60 operate as either write-back or leaky caches when processing the write requests.

Initially, compiler 18 processes test script 16 to generate machine executable instructions and automatically inject control instructions so that emulated instruction processors 24 mimic instruction processors having internal write buffers (90). After inserting the control instructions and generating instruction streams 19 as described above, instruction streams 19 are loaded into emulated instruction processors 24, e.g., into memory 40 of emulated instruction processor 24A (92).

Once loaded, emulated instruction processors 24 begins to execute the loaded instruction streams, e.g., instructions 42 stored in memory 40. State machines, such as state machine 48, read an instruction from the loaded instruction stream, e.g., instructions 42 (94).

Upon reading the instruction, state machine 48 determines the type of instruction. For example, state machine 48 may examine an operational code within each instruction to determine the specified instruction. If the instruction is one of emulation control instructions 46 (96), as indicated by the instruction operational code, state machine 48 toggles a control bit within emulator control register 50, such as pre-fetch control bit 44A, that is associated with one of emulation control instructions 46 (98).

If, however, the instruction is a write instruction (100), state machine 48 processes the write instruction in accordance with control bits 44 of emulator control register 50 (102). In particular, state machine 48 access emulator control register 50 and reads control bits 44, as further described in reference to FIG. 4.

In the event that the instruction is not one of emulation control instructions 46 or a write instruction, then state machine 48 simply executes the instruction (104). State machine 48 continues to read and execute instructions and terminates the process upon completing the loaded instruction stream (106).

Figure 4:
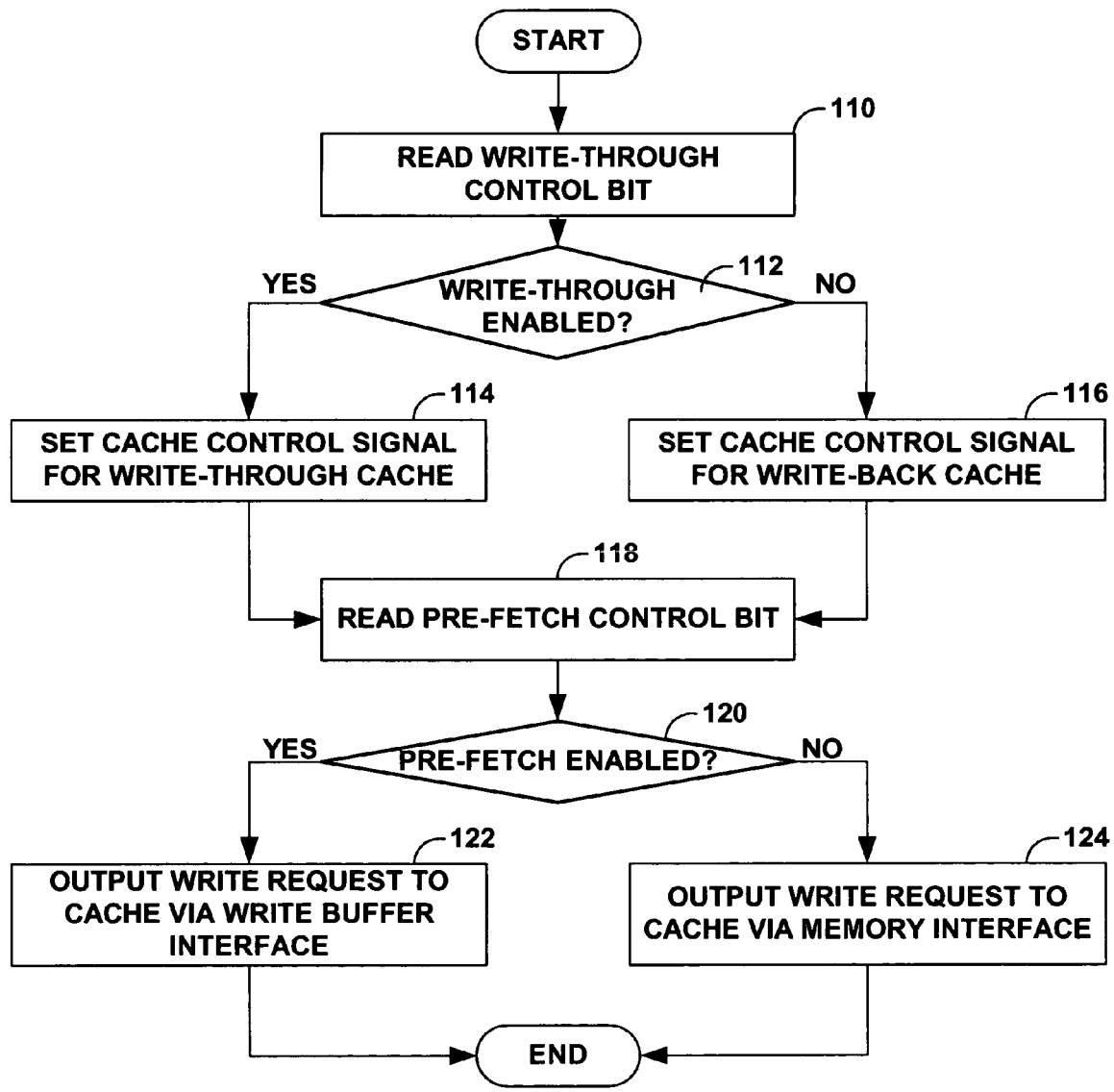
FIG. 4 is a flowchart further illustrating exemplary operation of the emulated instruction processor.

FIG. 4 is a flowchart further illustrating exemplary operation of an emulated instruction processor, e.g., emulated processor 24A, when processing write instructions in accordance with control bits 44. In particular, the flowchart of FIG. 4 illustrates operation of emulated instruction processor 24A during execution of instructions 42 and, more specifically, execution of write instructions stored within memory 40.

State machine 48 reads and executes instructions 42, including emulation control instructions 46, from memory 40. Upon reading a write instruction, state machine 48 reads leaky control bit 44B (110). Based on the state of leaky control bit 44B, state machine 48 either asserts or de-asserts cache control line 27A (112). If leaky control bit 44B indicates that leaky functionality is enabled, state machine 48 outputs cache control line 27A to indicate that second-level cache 60A is to operate as a leaky cache when servicing the write request's data (114). However, in the event that leaky control bit 44B indicates that leaky functionality is disabled, state machine 48 de-asserts cache control line 27A (116), indicating that second-level cache 60A is to operate as a write-back cache.

In addition, state machine 48 accesses emulator control register 50 and reads pre-fetch control bit 44A (118). State machine 48 receives the value of pre-fetch control bit 44A and determines whether a write pre-fetch mode is currently enabled (120). If pre-fetch control bit 44A indicates that pre-fetch mode is currently enabled, then state machine 48 sends a write request corresponding to the write instruction to second-level cache 60A via write buffer interface 25A (122). If pre-fetch control bit 44A indicates that the pre-fetch mode is currently disabled, state machine 48 sends the write request to second-level cache 60A via memory interface 23A (124).

In this manner, state machine 48 accesses emulator control register 50 when emulated instruction processor 24A processes a write instruction. By processing emulation control instructions 46, emulated instruction processor 24A mimics a processor having a fully-implemented internal write buffer.

Various embodiments of the invention have been described. These and other embodiments are within the scope of the following claims.

The invention claimed is:

1. A processor-based method comprising:
processing an emulation control instruction with an emulated instruction processor to set a state of a pre-fetch control bit within the emulated instruction processor, wherein the emulated instruction processor has a write buffer interface and a memory interface; and
processing a write instruction with the emulated processor to selectively output a write request via the write buffer interface or the memory interface based on the state of the pre-fetch control bit.

2. The method of claim 1, wherein the memory architecture includes a cache and the memory interface comprises a cache interface.

3. The method of claim 2, wherein selectively outputting a write request comprises outputting the write request via the write buffer interface to reserve ownership of one or more cache lines within the cache.

4. The method of claim 3, further comprising:
processing a second emulation control instruction with the emulated instruction processor to set a state of a cache control bit within the emulated instruction processor; and
outputting a cache control line when issuing the write request as a function of the state of the cache control bit.

5. The method of claim 4, wherein outputting a cache control line comprises:
outputting the cache control line to direct the cache to operate as a leaky cache when the state of the cache control bit is a first state; and outputting the cache control line to direct the cache to operate as a write-back cache when the state of the cache control bit is a second state different from the first state.

6. The method of claim 1, further comprising:
compiling test software to produce an instruction stream that includes the write request; and
inserting the emulation control instruction into the instruction stream during compilation to direct the emulated instruction processor to emulate write buffer functionality with the write buffer interface.

7. The method of claim 1, further comprising:
compiling test software to produce an instruction stream for processing by the emulated instruction processor, wherein the instruction stream includes the write request; and
inserting the emulation control instruction into the instruction stream during compilation and earlier in the instruction stream than the write request to enable write pre-fetching.

8. The method of claim 7, further comprising inserting a duplicate of the write instruction followed by a second emulation control instruction into the instruction stream after the first emulation control instruction, wherein the a second emulation control instruction disables write pre-fetching so that the emulated instruction processor outputs a write request associated with the duplicate write instruction via the write buffer interface and the write request associated with the non-duplicate write instruction via the memory interface.

9. The method of claim 7, further comprising modifying a non-emulated component based on the processing of the instruction stream by the emulated instruction processor.

10. The method of claim 9, wherein the non-emulated component comprises a memory architecture.

11. The method of claim 7, further comprising modifying the test script based on the processing of the instruction stream by the emulated instruction processor.

12. A processor-based method comprising:
compiling test software to output an instruction stream for execution by for an emulated instruction processor;
processing the instruction stream during compilation to insert one or more instructions into the instruction stream to direct the emulated instruction processor to output pre-fetch write requests out a write buffer interface upon execution of the instruction stream.

13. The method of clam 12, wherein processing the instruction stream during compilation comprises:
identifying a first write instruction within the instruction stream;
generating a set of instructions including:
(a) a first emulator control instruction to enable a pre-fetch mode of the emulated processor;
(b) a second write instruction following the first emulator control instruction to cause the emulated instruction processor to output a write request out the write buffer interface, and
(c) a second emulator control instruction following the second write instruction to disable the pre-fetch mode;
inserting the generated set of instructions within the instruction stream prior to the first write instruction.

14. The method of claim 13, wherein the second write instruction is a duplicate of the first write instruction.

15. The method of claim 12, further comprising processing the instruction stream during compilation to further insert an emulation control instruction into the instruction stream to direct the emulated instruction processor to control a cache control line associated with the pre-fetch write requests.

16. The method of claim 12, wherein the cache control line directs a cache to selectively operate as a write-back cache or a write through cache when processing the pre-fetch write requests.

17. The method of clam 12, wherein processing the instruction stream during compilation comprises:
identifying a group of write instructions within the instruction stream;
inserting an emulator control instruction within the instruction stream prior to the group of write instructions to enable a pre-fetch mode of the emulated processor and direct the emulated processor to output write requests associated with the write instructions out the write buffer interface; and
inserting a branching type instruction within the instruction stream following the group of write instructions to direct the emulated instruction processor to re-execute the emulator control instruction and the group of write instructions to output the write requests associated with the write instructions out the memory interface.

18. A computer-implemented system for emulating write buffer operation comprising:
a computing system to provide an emulation environment; and
software executing within the emulation environment to emulate an instruction processor having a write buffer interface and a memory interface, wherein the software emulates the instruction processor by selectively outputting a write request on the write buffer interface or the memory interface in response to an emulation control instruction embedded within an instruction stream.

19. The system of claim 18, wherein the emulated instruction processor includes an emulation control register and a state machine, wherein the state machine processes the emulation control instruction and updates a pre-fetch control bit of the emulation control register to selectively enable or disable a pre-fetch mode for the emulated instruction processor.

20. The system of claim 19, further comprising a compiler executed by the computing system, wherein the compiler compiles test software to generate the instruction stream, and automatically inserts the emulator control instruction into the instruction stream to selectively enable or disable the pre-fetch mode of the emulated instruction processor.

21. The system of claim 20, wherein the compiler:
identifies a first write instruction within the instruction stream;
generates a set of instructions including (a) a first emulator control instruction to enable the pre-fetch mode of the emulated processor, (b) a second write instruction following the first emulator control instruction to cause the emulated instruction processor to output the write request out the write buffer interface, and (c) a second emulator control instruction following the write instruction to disable the pre-fetch mode; and
inserts the generated set of instructions within the instruction stream prior to the first write instruction.

22. The system of claim 20, wherein the compiler:
identifies a group of write instructions within the instruction stream;
inserts an emulator control instruction within the instruction stream prior to the group of write instructions to enable a pre-fetch mode of the emulated processor and direct the emulated processor to output write requests associated with the write instructions out the write buffer interface; and inserts a branching type instruction within the instruction stream following the group of write instructions to direct the emulated instruction processor to re-execute the emulator control instruction and the group of write instructions to output the write requests associated with the write instructions out the memory interface.

23. The system of claim 18, wherein the software processes a second emulation control instruction embedded within the instruction stream and asserts a cache control line of the emulated instruction processor and associated with an attribute of the write request.

24. The system of claim 23, wherein the emulated instruction processor includes an emulation control register and a state machine, wherein the state machine processes the second emulation control instruction and updates a leaky control bit of the emulation control register to control whether a cache operates as a leaky cache or a write-back cache upon receiving the write request output by the emulated instruction processor.

25. A computer-implemented system for emulating write buffer operation comprising:

computing means for providing an emulation environment;

compiling means for compiling a test script to produce an instruction stream having at least one write instruction; and processor emulating means for emulating an instruction processor having a write buffer interface and a memory interface, wherein the processor emulating means includes selecting means for outputting a write request on the write buffer interface or the memory interface in response to an emulation control instruction embedded within an instruction stream.

26. The system of claim 25, wherein processor emulating means comprises:

storing means for storing a pre-fetch control bit that enables a pre-fetch mode; and controlling means for controlling the emulation control instruction and updating the pre-fetch control bit of the storing means.

27. The system of claim 25, wherein processor emulating means comprises:

storing means for storing a leaky control bit that enables a leaky mode that controls a state of a cache control line that directs a cache to operate as a leaky cache or a write-back cache upon receiving the write request output by the processor emulating means; and controlling means for processing a second emulation control instruction of the instruction stream and updating the leaky control bit of the storing means.

* * * * *